United States Patent [19]
Sumita

[11] 3,858,965
[45] Jan. 7, 1975

[54] FIVE LAYER ANTI-REFLECTION COATING
[75] Inventor: Haruki Sumita, Osaka, Japan
[73] Assignee: Minolta Camera Kabushiki Kaisha, Osaka, Japan
[22] Filed: Oct. 15, 1973
[21] Appl. No.: 406,569

Related U.S. Application Data
[63] Continuation-in-part of Ser. No. 304,140, Nov. 6, 1972, Pat. No. 3,781,090.

[30] Foreign Application Priority Data
July 10, 1972 Japan................. 47-68903

[52] U.S. Cl. ............................. 350/164, 117/33.3
[51] Int. Cl. ............................................. G02b 5/28
[58] Field of Search .................. 350/1, 163–166; 117/33.3

[56] References Cited
UNITED STATES PATENTS
3,706,485 12/1972 Fawcett et al. ..................... 350/164
3,738,732 6/1973 Ikeda ................................. 350/164
3,804,491 4/1974 Morokuma et al. ................ 350/164

Primary Examiner—Ronald J. Stern
Attorney, Agent, or Firm—Jackson & Jones

[57] ABSTRACT

A multi-layered anti-reflection coating for use with a glass substrate includes five layers of coating material, the first layer furtherest from the substrate having an optical thickness of a preselected design wavelength, $\lambda_o$, in the range of $0.260 \lambda_o > N_1 d_1 > 0.230 \lambda_o$ and an index of refraction in the range of 1.35 to 1.62. The second layer has an optical thickness in the range of $0.600 \lambda_o > N_2 d_2 > 0.400 \lambda_o$ and an index of refraction in the range of 1.95 to 2.30. The optical thickness of at least one of the third, fourth and fifth layers is in the range of $0.500 \lambda_o > N d > 0.250 \lambda_o$ while the optical thickness of at least another of these layers is in the range of $0.250 \lambda_o > N d > 0.060 \lambda_o$. The third layer has an index of refraction in the range of 1.56 to 1.90 and the fourth layer has an index of refraction in the range of 1.35 to 1.62. The fifth layer adjacent the substrate has an index of refraction in the range of 1.35 to 1.90. The optical thicknesses of the layers can be varied to compensate for any variations from the theoretical design indices of refractions.

12 Claims, 4 Drawing Figures

FIVE LAYER ANTI-REFLECTION COATING

RELATED APPLICATIONS

This is a continuation-in-part application of U.S. Patent application Ser. No. 304,140 filed Nov. 6, 1972, now U.S. Pat. No. 3,781,090 issued Dec. 25, 1973.

BACKGROUND OF THE INVENTION

1. Field of the Invention

The present invention is directed to an anti-reflection coating for a substrate to minimize the reflectance of applied energy and more particularly, to five-layer anti-reflective optical coatings.

2. Description of the Prior Art

There have been numerous attempts to provide various anti-reflective coatings for reducing the reflection of energy off of a substrate. In recent years, the primary emphasis in the optics field has been upon reducing the reflectance of light from glass substrates in the visible spectrum of 400 to 700 nanometers. A large number of solutions have been offered to decrease the Fresnel reflection of optically transparent material especially in optical lenses used in cameras and the like.

The use of single and double layers of anti-reflecting coatings has become extremely popular. Since the visual spectrum extends over a relatively wide wavelength band, and a single layer is principally designed to nullify reflectance at a single design wavelength, its use has not provided satisfactory results over the entire visual region especially for low index glass having a refractive index from 1.45 to 1.9.

Three layer anti-reflection coatings such as in U.S. Pat. No. 3,185,020 and U.S. Pat. No. 3,604,784 have greatly improved the desired optical characteristics over the single and double layer coatings. The prior art has further utilized anti-reflection coatings with equivalent thickness layers such as disclosed in U.S. Pat. No. 3,432,225 and U.S. Pat. No. 3,565,509. Generally these coatings have been designed to produce an equivalent thickness layer which consists of two thin layers that work as a quarter wavelength medium refractive index layer in the anti-reflection coating. Manufacturing tolerance problems are recurrent with the use of these thin individual layers and the final summation of their effect is simply to provide an equivalent quarter wavelength layer in the design.

The use of four layers of different evaporated materials provides superior results over that of the triple layer structure. An example of this four different material coating is disclosed in U.S. Pat. No. 3,463,574. Since it is necessary to use four materials, there are production problems relating to the evaporation and the precise control of the layer thickness and the design is still limited to various refractive index combinations corresponding to the substrate. In addition, the layered structure has a tendency to fractionalize and it is often found in production that the available material does not maintain or even correspond to its purported theoretical refractive index.

In the commercial production of anti-reflection coatings, a choice of material having a high or medium index of refraction generally requires a metal oxide which in commercial use is often found to be inhomogeneous and unstable in its refractive index. This is also true with high indexed fluorides such as $CeF_3$, $LaF_3$ and $NdF_3$.

In the U.S. Pat. No. 3,565,509 a multi-layer anti-reflection coating using a combination of only two materials is provided. This is accomplished by using an array of layers to obtain an equivalent layer having an equivalent index of refraction and an equivalent thickness. The properties of the equivalent layer are such that in order to obtain the optimum anti-reflection band width, the thickness of the third layer from the substrate should be less than the sum of the thickness of the thin layer next to the substrate plus a half wavelength.

Basically, the designs of the anti-reflection coatings in the prior art have relied upon the classical solution utilizing a quarter wavelength system as represented by the Jupnik's solution, set forth in "Physics of Thin Film," volume 2, p. 272, by G. Hass and R. E. Thun, Academic Press. Using this approach in a Jupnik four layer anti-reflection coating structure having, for example, an optical thickness of $\lambda/4$, $\lambda/2$, $\lambda/4$, $\lambda/4$, their refractive indices must be proportionally represented by $N_1 N_4 = N_3 \sqrt{N_s N_o}$, where N represents the index of refraction and $N_4$ would be the index of refraction adjacent the substrate having an index of refraction of $N_s$. $N_o$ is the index of refraction of the medium such as air.

Five layer anti-reflection coating designs in accordance with the classical quarter wavelength approach would produce similar restrictions that effect the utility and flexiblity of an anti-reflective coating. In addition, materials of high and middle refractive indices frequently have refractive indices that are not consistent nor readily adaptable to a production line technique. This problem is particularly acute when each layer must rigidly conform to the hypothetical design solution.

Finally, the reflectance curves for various wavelengths are symmetrical with respect to $1/\lambda_o$, where $\lambda_o$ is the design wavelength. In the classical design, this can produce a minimum reflection at $\lambda_o$ and at its integer magnified wavelengths, and any refractive index deviations cannot be adequately compensated by variations in the optical thickness.

SUMMARY OF THE INVENTION

A five layer anti-reflection coating for use with a substrate to reduce reflectance of energy such as visible light is provided having the following range of optical thicknesses:

$0.260 \lambda_o > N_1 d_1 > 0.230 \lambda_o$
$0.600 \lambda_o > N_2 d_2 > 0.400 \lambda_o$
$0.500 \lambda_o > N_3 d_3 > 0.060 \lambda_o$
$0.500 \lambda_o > N_4 d_4 > 0.060 \lambda_o$
$0.500 \lambda_o > N_5 d_5 > 0.060 \lambda_o$.

$N$ refers to the index of refraction and $d$ refers to the physical thickness of the layer, the subnumbers corresponding to the layers with $N_1 d_1$ being the layer furtherest from the substrate; the optical thickness of each of the above layers being adjustable within the above ranges to compensate for variations from any design index of refraction whereby the design reflectance can be maintained.

The first and fourth layer have an index of refraction of 1.35 to 1.62. The second layer has an index of refraction of 1.95 to 2.30. The third layer has an index of refraction of 1.56 to 1.90 while the fifth layer has an index of refraction of 1.35 to 1.90.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 5 is a cross sectional schematic of an embodiment of the present invention.

DESCRIPTION OF THE PREFERRED EMBODIMENT

As may be appreciated by those skilled in the art, the use of various metal oxides and fluorides as optic coatings frequently do not have a stable refractive index nor a homogeneous structure. Solutions and compounds of these materials are subject to a number of variables such as the starting stoichiometric structure of the material, the equipment used and the evaporation techniques. In commercial production it is extremely difficult to maintain the precise and consistent control of the various layers of an anti-reflection coating to maintain the final result within the design parameters of the anti-reflection coatings.

In contrast, a low index of refraction material such as $MgF_2$ has a relatively stable index of refraction of 1.385 even with film layer thicknesses thinner than $\lambda_0/2$ while also maintaining a homogeneous constituency.

Figure 1:
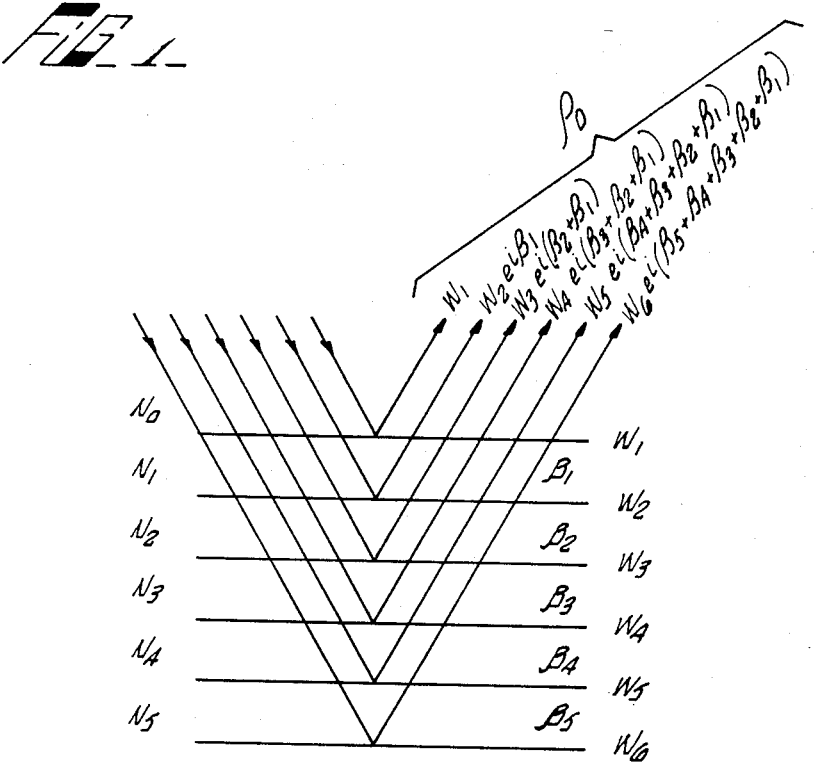
FIG. 1 is a schematic diagram of the reflection from a multi-layered coating.
Figure 2:
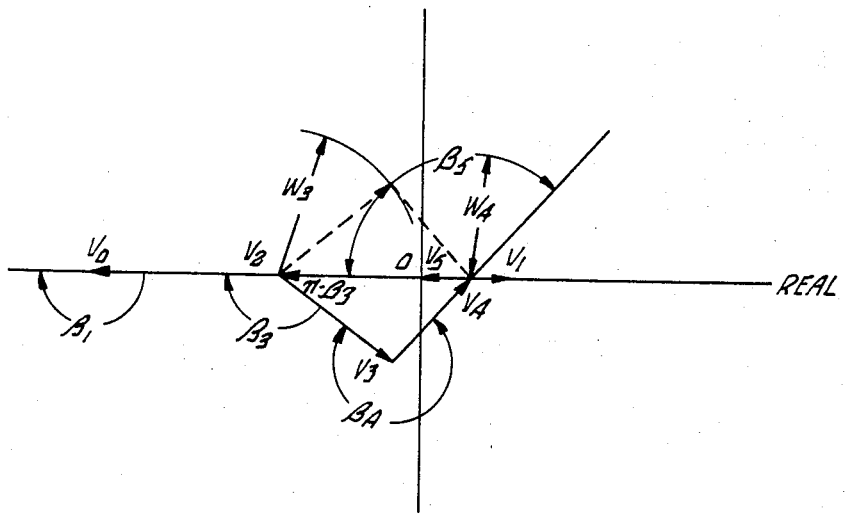
FIG. 2 is a vector diagram of a non-classical design solution.

The following derivations in conjunction with FIGS. 1 and 2 will help explain the advantages of the present invention over that of the classical quarter wave design utilized in the prior art.

In the following equations:

$\rho$ is the reflection coefficient and is a complex number from which the reflectance $R$ is derived as follows:

$$R = |\rho|^2.$$

$\beta$ is the phase factor due to the rays traveling through the layer twice as disclosed in FIG. 1 and for normal incidence at the $i$ layer is expressed by, $$\beta_i = 2 \cdot 2 \pi/\lambda \cdot N_i d_i \quad (1)$$

$N$ being the refractive index and $d$ being the physical thickness.

$W$ is the Fresnel coefficient at the boundary and is defined by, $$W = (N_{i-1} - N_i)/(N_{i-1} + N_i) \quad (2)$$

where the suffix $i$ represents an integer number of layers from the air interface.

The total reflection coefficient $\rho_o$ can be written approximately as $$\rho_o = W_6 e^i (\beta_5+\beta_4+\beta_3+\beta_2+\beta_1) + W_5 e^i (\beta_4+\beta_3+\beta_2+\beta_1) + W_4 e^i (\beta_3+\beta_2+\beta_1) + W_3 e^i (\beta_2+\beta_1) + W_2 e^i \beta_1 + W_1. \quad (3)$$

This equation is graphically represented in FIG. 1 where the reflected rays from the layer boundaries are simply added up and contribute to the total reflectance if we ignore any mutual interference effects.

As can be seen in FIG. 2, every term can be considered as a vector, $V_0 \ldots V_5$. The summation of these vectors will give the final reflection coefficient $\rho_o$. If these vectors form a closed loop, the final reflection $\rho_o$ will be zero.

This can be more easily understood when the vectors are shown in the complex plane. Referring to FIG. 2, the Absessa is the Real Axis and the phase angle $\beta$ can be measured from this axis in a counter-clockwise direction.

In order to solve equation (3) having a large number of variables, it is necessary to eliminate as many variables as possible, and accordingly the following assumptions are made in order to achieve a first approximate solution for a design wavelength $\lambda_0$:

1. The first coating layer next to the air or medium will contribute to the total anti-reflection effect and is set at, $N_1 d_1 = \lambda_0/4$.
2. The second coating layer will be utilized to increase wavelength band of the design and will be, $N_2 d_2 = \lambda_0/2$.

These assumptions produce the following phase factors:

$$\beta_1 = 4 \pi/\lambda \cdot N_1 d_1 = \pi.$$
$$\beta_2 = 4 \pi/\lambda \cdot N_2 d_2 = 2\pi.$$

(4)

As fully described in the allowed co-pending parent U.S. patent application Ser. No. 304,140 filed Nov. 6, 1972, now U.S. Pat. No. 3,781,090 issued Dec. 25, 1973 and incorporated by reference, the vector solution graphically shown in FIG. 2 varies from the classical Jupnik's solution. The optical thickness of each layer of the present inventive design is not limited to the classical quarter wavelength design with the corresponding refractive index restrictions.

With the classical solution, the phase angle $\beta$ will be an integer multiple of $\pi$ and the vector will terminate on the real axis only. With the present invention, it is possible to introduce a non-quarter wavelength structure in the third, fourth and fifth layers with their vectors ending in the imaginary plane rather than on the real axis. The Fresnel coefficients can be adjusted by the phase angle in order to terminate the $V_5$ vector at the origin (O).

As seen in FIG. 2, the vector summation represents respectively the reflection from the air boundary $V_o$ and each layer, $V_1$ through $V_5$.

The vectors $V_o$, $V_1$ and $V_2$ lie on the real axis with the phase angle $\beta_i$ measured counter-clockwise as the optical thickness increases in accordance with equation (1); $V_1$ having an opposite sign from $V_2$. Vectors $V_3$ and $V_4$ are not restricted to the classical solution and accordingly their phase angles are not integer multiples of $\pi$.

The length of the vectors is a function of the Fresnel coefficient. As represented on the graph of FIG. 2, each vector is added to the previous vector to summarize the total reflectance. The vectors are not drawn to exact scale and are presented only for illustration.

In FIG. 2, $V_5$ is shown on the real axis simply for convenience and it should be understood that $V_4$ could easily terminate in the imaginary plane with $V_5$ having a phase angle that is not an integer multiple of $\pi$.

With $V_5$ lying on the real axis, the following mathematical relationship exists:

$$\beta_3 + \beta_4 + \beta_5 = 3\pi \quad (5)$$

With the relationships of the refractive indices assumed as follows:

$N_1 < N_2$, $N_2 > N_3$, $N_3 > N_4$, $N_4 < N_5$ and $N_5 < N_s$, the respective Fresnel coefficient, W, will have $W_1$, $W_2$, $W_5$ and $W_6$ with negative signs and $W_3$ and $W_4$ with positive signs due to relative values of the indices of refraction assumed above.

Inserting equations (4) and (5) into (3) and setting equation (3) to the optimum condition of zero, the following solutions can be obtained:

$$\sin(\beta_3+\beta_4) = -(W_4/W_5)\sin\beta_3 \quad (6)$$

$$\cos\beta_3 = \frac{W_5^2 - (W_3+W_2-W_1-W_6)^2 - W_4^2}{2W_4(W_3+W_2-W_1-W_6)}. \quad (7)$$

By picking the desired refractive indices, the phase angles and correspondingly the optical thicknesses can be obtained from equations (5), (6), (7) and (1).

As should be realized, other solutions can be utilized and the above is only representative of one relatively simple solution utilizing the broad concepts of the non-classical design approach.

With the present invention, at least one layer among the third through fifth layers will have an optical thickness greater than $\lambda_0/4$ while another will have an optical thickness smaller than $\lambda_0/4$.

The relationship between the refractive indices will be as follows:

$$N_1 \leq N_4 < N_5 \leq N_3 < N_2$$
$$N_5 < N_s$$

where $N_s$ is the index of refraction of the substrate and $N_1$ is the index of refraction of the layer having the air or medium interface.

$N_1$ and $N_4$ will have a low refractive index NL. $N_2$ will have a high refractive index, NH, while $N_3$ will have a medium refractive index NM. $N_5$ will have either a low, NL, or medium, NM, refractive index.

The present invention provides a five layer antireflection coating which permits flexibility in varying the optical thicknesses of the individual layers to compensate for deviations in the refractive indices particularly in the relatively high and medium indices ranges, that is indices generally having a value above 1.6. This is accomplished by providing a five-layer antireflection coating structure that is not limited to the rigid restrictions of the classical quarter wavelength design but enables the optical thickness of the various layers to be altered as required to maintain the low reflectance that is theoretically possible with theoretical material having a consistent index of refraction.

The first coating layer which is next to the medium, that is, generally the air inner face coating and the fourth layer, will generally have a refractive index range between 1.35 and 1.62. Some of the materials which are capable of being utilized on the first and fourth layers with their refractive indices in parentheses are $MgF_2$ (1.385), $SiO_2$ (1.46), $ThF_4$ (1.5), $LaF_2$ (1.56), $Na_3(AlF_4)$ (1.35), $Al_2O_3$ (1.56 – 1.65), and $CeF_3$ (1.62). Other materials having the desired optical characteristics and a refractive index between 1.35 and 1.62 can also be utilized.

The second layer relative to the top of the antireflection coating has a relatively high refractive index generally equal to or between NH = 1.95 and 2.30. A number of materials can be utilized and illustrative of such materials are the following with their index of refraction in parentheses:

$CeO_2$ (2.30 – 2.00), $ZrO_2$ (2.10 – 1.95), $TiO_2$ (2.30 – 2.00), $Ta_2O_5$ (2.30 – 2.00), $ZnS$ (2.30 – 2.20), and $ThO_2$ (2.20 – 2.00).

The third layer from the top of the anti-reflection coating will have a refractive index equal to or between NM = 1.90 and 1.56, and illustrative of materials which can be utilized are the following with their index of refraction in parentheses: $Al_2O_3$ (1.65 – 1.56), $MgO$ (1.72), $CeF_3$ (1.62), $LaF_3$ (1.59), $NdF_3$ (1.60), $BeO$ (1.60), $ThOH_2$ (1.70), $InO_2$ (1.8 – 1.9) and a mixture of MgO and $Al_2O_3$ (1.72 – 1.65).

The fifth layer from the top of the anti-reflection coating will have a refractive index substantially in the range of (NL – NM) = 1.35 to 1.90. The above illustrative material for NL and NM in the first, third and fourth layers while not limiting can be utilized in the fifth layer.

The range of optical thickness for coating layers of the present invention is set forth as follows:

$0.260\,\lambda_0 > N_1 d_1 > 0.230\,\lambda_0$
$0.600\,\lambda_0 > N_2 d_2 > 0.400\,\lambda_0$
$0.500\,\lambda_0 > N_3 d_3 > 0.060\,\lambda_0$
$0.500\,\lambda_0 > N_4 d_4 > 0.060\,\lambda_0$
$0.500\,\lambda_0 > N_5 d_5 > 0.060\,\lambda_0$ where $\lambda_0$ is the design wavelength.

The optical thickness of the third through fifth layers is set forth in the above optical thickness table over their broad applicable range; however, as a result of the non-quarter design approach of the present invention, it is possible to offer alternative solutions or design parameters to the third through fifth layers that can be summarized as follows.

When one of the third through fifth layers are thicker than $\lambda_0/4$, then another of these layers will be thinner than $\lambda_0/4$.

As can be readily understood, the flexibility of the present invention in permitting optical thickness compensation to meet the design parameters provides the optical designer with a significant advancement in the art.

The explanation of the present invention to this point has been for any wavelength $\lambda_0$ to produce $\rho_0 = 0$. However, for our prime application in the visual spectrum, it is desirable to minimize the reflectance in as broad a range as possible, e.g. the entire visual spectrum range 400 ~ 700 nm.

Utilizing the above approximate solution, and a computer, the following designs were optimized. The technique utilized with the computer is the so-called damped least square method; that is to minimize the quantity defined by:

$$Q = \sum_{\lambda=400}^{\lambda=700} W(\lambda)[R(\lambda) - R^*(\lambda)]^2$$

where $W(\lambda)$ is a weighting factor, and $R^*(\lambda)$ is a target value of reflectance.

Due to the non-quarter wavelength design, it is possible to compensate the reflectance with respect to refractive index variations by thickness adjustments of the deposited material in the third, fourth and fifth layers. While in any optical design there will be optimum values for a relatively high refractive index layer and a relatively middle range refractive index layer for a particular substrate it has been often found in practice that the particular materials are not available or practical commercially or the subsequent evaporated film layer will have an index of refraction which will fluctuate from the theoretical value. With the present invention, it is possible to compensate for these variations and produce a commercial anti-reflection coating.

As an illustration of the present invention, a five layer anti-reflective coating structure in accordance with the non-classical design criterion set forth above is provided in the following table.

TABLE 1

| Layer | Film Index | Substrate Index | | |
|---|---|---|---|---|
| | | 1.52 | 1.62 | 1.72 |
| 1st | 1.385 | $0.247\lambda_o$ | $0.246\lambda_o$ | $0.245\lambda_o$ |
| 2nd | 2.150 | $0.456\lambda_o$ | $0.452\lambda_o$ | $0.449\lambda_o$ |
| 3rd | 1.650 | $0.176\lambda_o$ | $0.162\lambda_o$ | $0.160\lambda_o$ |
| 4th | 1.385 | $0.400\lambda_o$ | $0.341\lambda_o$ | $0.265\lambda_o$ |
| 5th | 1.470 | $0.072\lambda_o$ | $0.136\lambda_o$ | $0.191\lambda_o$ |

Figure 3:
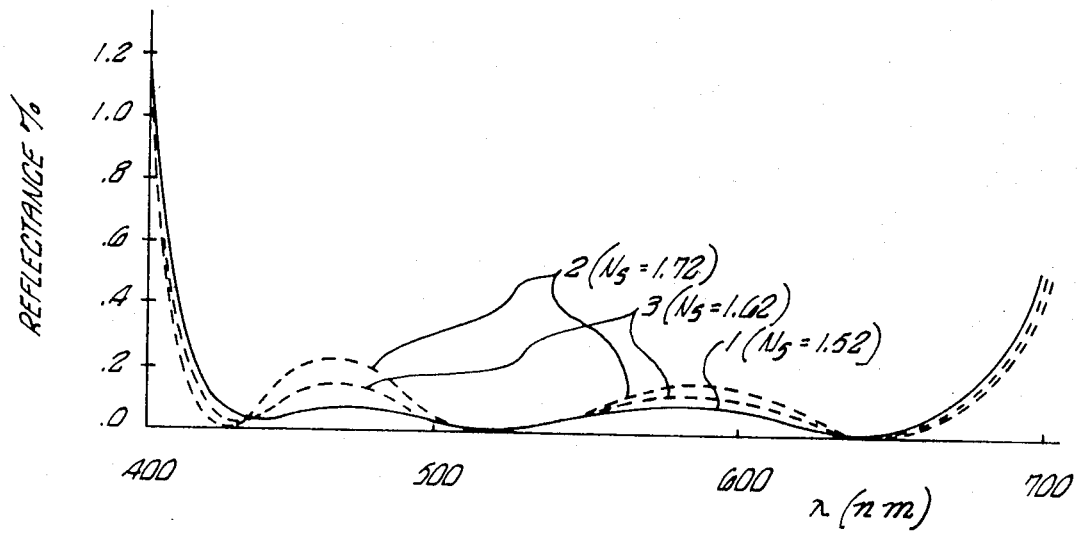
FIG. 3 is a reflectance graph of Table 1.

The resulting reflectance is disclosed in FIG. 3 wherein Curve 1 represents $N_s = 1.52$ while Curve 2 represents $N_s = 1.72$. The substrate 1.62 is plotted as Curve 3 on the graph.

As can be seen from the reflectance curves, a minimum amount of light is reflected across the visual spectrum for each of the substrates. This five layer coating design permits the extreme edges of the wavelength band to have a minimal residual reflectance as compared to that of the prior art while facilitating the commercial production of the coating on lenses by permitting design variances in optical thicknesses to accommodate the actual as opposed to hypothetical indices of refraction. The minimum residual reflectance at the extreme edges of the visual spectrum is particularly important in color photography.

It should be realized that the present invention is flexible enough to accommodate any varying or graded index of refraction structures in coating layers using a metal oxide.

It is believed that in a high vacuum depositing process the molecular structure of many layers such as metal oxide will vary apparently depending upon the availability of oxygen. Thus, many metal oxide films will disclose a graded index structure with respect to their optical thickness.

Attempts have been made in the prior art with some success such as in U.S. Pat. No. 3,604,784 to precisely control the feeding of oxygen into the depositing chamber during the evaporation of the metal oxide. This procedure lowers the high vacuum and is believed to increase the porosity of the film structure.

However, even with the control of oxygen, many of the metal oxides will still have a varying or graded index structure.

It is possible, however, with a suitable design modification in the non-classical approach to utilize such a graded index structure in the optic design.

An example of a graded index metal oxide is $ZrO_2$. It has been found as an example, that when a layer of $ZrO_2$ is evaporated without introducing any oxygen in a vacuum of $3 \times 10^{-5}$ torrs at a substrate temperature of 380°C, it appears that the metal oxide decomposes and will produce variations in the index of refraction. It is possible, however, to take this gradation of refraction into account in utilizing a non-classical design approach. Basically, we can divide the total graded index layer into a hypothetical mathematically convenient number of sublayers and with the assistance of a computer, derive the best combination of refractive indices of each of the sublayers to fit the measured spectral reflectance for different substrates. The structure of the indexed layer can be analyzed empirically by first measuring the spectral reflectance to determine the refractive index of each sublayer. This can be accomplished by dividing the total optical thickness of the gradated index into, for example five thin layers and letting the computer find the best combination of refractive indices to fit the measured spectral reflectance for, as an example, three different substrates, $N_s = 1.52, 1.62$ and 1.72. The computer is capable of matching the refractive index of the five layers using the damped least square method which is to minimize $$\Sigma \, W(\lambda) \, [R(\lambda) - R^*(\lambda)]^2$$

where
$W(\lambda)$ is weighting function
$R(\lambda)$ is calculated reflectance
$R^*(\lambda)$ is measured reflectance.

By utilizing this computer method, it is possible to successfully integrate a graded index layer into the design parameters of the non-classical approach. The following TABLE 2 discloses as an illustration a four layer non-classical design that includes graded index layers of $ZrO_2$ as follows:

TABLE 2

| Medium | Ref. Index | Optical Thickness $\lambda_o = 510$ nm | |
|---|---|---|---|
| Air | | | |
| $MaF_2$ | 1.385 | | $0.251\lambda_o$ |
| $ZrO_2$ | 2.095 | $0.1014\lambda_o$ | |
| | 1.954 | $0.1014\lambda_o$ | |
| | 2.250 | $0.1014\lambda_o$ | $0.534\lambda_o$ |
| | 2.068 | $0.1014\lambda_o$ | |
| | 2.008 | $0.1014\lambda_o$ | |
| $CeF_3$ | 1.615 | | $0.194\lambda_o$ |
| $SiO_2$ | 1.470 | | $0.334\lambda_o$ |
| Substrate | 1.520 | | |

Figure 4:
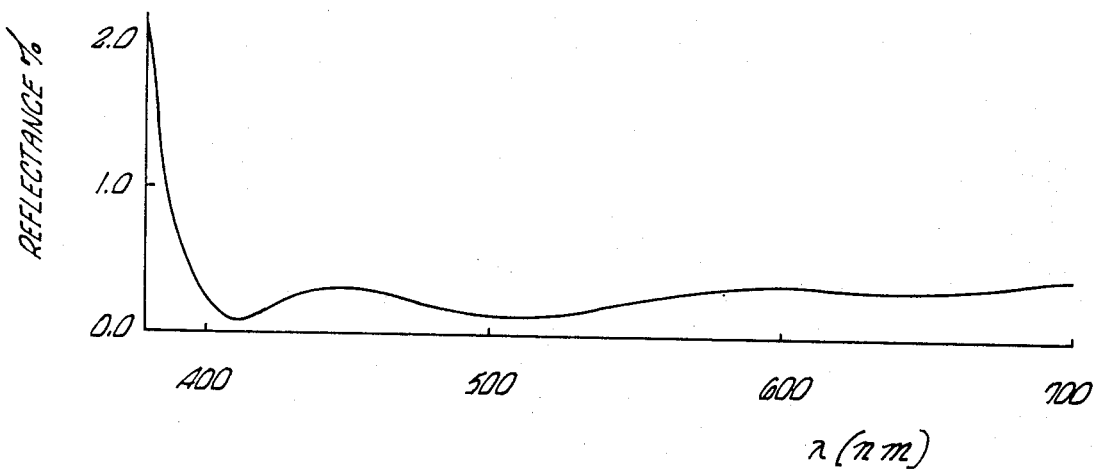
FIG. 4 is a reflectance graph of Table 2.

The reflectance graph of TABLE 2 is disclosed in FIG. 4. While TABLE 2 represents a four layer coating, it should be realized that the design principles are equally applicable to a five layer coating in accordance with the present invention. FIG. 5 discloses a cross sectional schematic of an embodiment of the present invention comprising a first layer, 12, a second layer 14, a third layer 15, a fourth layer 16, a fifth layer 18 and a substrate 20.

While the specific embodiments of the present invention are illustrated in the visual spectrum range of 400 to 700 nanometers, it should be realized that the broad principles of the present invention are also applicable in the ultraviolet and infrared wavelength range with appropriate adjustments of the layer film materials, refractive indices and substrates.

What is claimed is:

1. A multi-layered anti-reflection coating, for use with a substrate to reduce reflectance of light, comprising at least five layers of which a first layer furthest from the substrate has an optical thickness of a preselected design wavelength, $\lambda_o$, in the range of $0.260 \lambda_o > N_1 d_1 > 0.230 \lambda_o$ and an index of refraction in the range of 1.35 to 1.62; a second layer has an optical thickness in the range of $0.600 \lambda_o > N_2 d_2 > 0.400 \lambda_o$ and an index of refraction in the range of 1.95 to 2.30; a third layer has an index of refraction in the range of 1.56 to 1.90; a fourth layer has an index of refraction in the range of 1.35 to 1.62, and a fifth layer has an index of refraction in the range of 1.35 to 1.90; the optical thickness of at least one of the third, fourth and fifth layers is in the range of $0.500 \lambda_o > N d > 0.250 \lambda_o$ while the optical thickness of at least another layer of the third, fourth and fifth layers is in the range of $0.250 \lambda_o > N d > 0.060 \lambda_o$ wherein N refers to the index of refraction and d refers to the physical thickness of the layer.

2. A multi-layered anti-reflection coating as in claim 1 wherein the substrate has an index of refraction of $N_s$ and the indices of refraction are related as follows, $N_4$ equals or is greater than $N_1$ and $N_2$ is greater than each of the other indices of refraction.

3. A multi-layered anti-relection coating as in claim 1 wherein the first and fourth coating layers are selected from the group consisting of $MgF_2$, $SiO_2$, $ThF_4$, $LaF_2$, $Na_3(AlF_4)$, $Al_2O_3$, and $CeF_3$.

4. A multi-layered anti-reflection coating as in claim 1 wherein the second coating layer is selected from the group consisting of $CeO_2$, $ZrO_2$, $TiO_2$, $Ta_2O_5$, ZnS and $ThO_2$.

5. A multi-layered anti-reflection coating as in claim 1 wherein the third coating layer is selected from the group consisting of $Al_2O_3$, MgO, $CeF_3$, $LaF_3$, $NdF_3$, BeO, $InO_2$, $ThOH_2$ and a mixture of MgO and $Al_2O_3$.

6. A multi-layered anti-reflection coating as in claim 1 wherein the fifth coating layer is selected from the group consisting of $MgF_2$, $SiO_2$, $ThF_4$, $LaF_2$, $Na_3(AlF_4)$, $Al_2O_3$, $CeF_3$, $NdF_3$, BeO, MgO, $InO_2$, $ThOH_2$ and a mixture of MgO and $Al_2O_3$.

7. A multi-layered anti-reflection coating as in claim 1 wherein the first and fourth coating layers are selected from the group consisting of $MgF_2$, $SiO_2$, $ThF_4$, $LaF_2$, $Na_3(AlF_4)$, $Al_2O_3$, and $CeF_3$; the second coating layer is selected from the group consisting of $CeO_2$, $ZrO_2$, $TiO_2$, $Ta_2O_5$, ZnS and $ThO_2$; the third coating layer is selected from the group consisting of $Al_2O_3$, MgO, $CeF_3$, $LaF_3$, $NdF_3$, BeO, $InO_2$, $ThOH_2$ and a mixture of MgO and $Al_2O_3$; and the fifth coating layer is selected from the group consisting of $MgF_2$, $SiO_2$, $ThF_4$, $LaF_2$, $Na_3(AlF_4)$, $Al_2O_3$, $CeF_3$, $NdF_3$, MgO, BeO, $InO_2$, $ThOH_2$ and a mixture of MgO and $Al_2O_3$.

8. A multi-layered anti-reflection coating as in claim 7 wherein the substrate has an index of refraction of $N_s$ and the indices of refraction are related as follows:

$N_1 \leqslant N_4 < N_5 \leqslant N_3 < N_2$ with $N_5 < N_s$.

9. A multi-layered anti-reflection coating as in claim 1 wherein the substrate has an index of refraction of $N_s$ and the indices of refraction are related as follows:

$N_1 \leqslant N_4 < N_5 \leqslant N_3 < N_2$ with $N_5 < N_s$.

10. A multi-layered anti-reflection coating as in claim 1 wherein one of the third through fifth layers comprises a metal oxide.

11. A multi-layered anti-reflection coating as in claim 1 wherein the substrate is a glass having an index of refraction $N_s$ in the range of 1.42 to 1.72.

12. A multi-layered anti-reflection coating, for use with a substrate to reduce reflectance of light, comprising at least five layers of which a first layer furtherest from the substrate has an optical thickness of a preselected design wavelength $\lambda_o$, in the range of $0.260 \lambda_o > N_1 d_1 > 0.230 \lambda_o$ and an index of refraction in the range of 1.35 to 1.62; a second layer has an optical thickness in the range of $0.600 \lambda_o > N_2 d_2 > 0.400 \lambda_o$ and an index of refraction in the range of 1.95 to 2.30; a third layer has an index of refraction in the range of 1.56 to 1.90; a fourth layer has an index of refraction in the range of 1.35 to 1.62; and a fifth layer has an index of refraction in the range of 1.35 to 1.90; the optical thickness of at least one of the third, fourth and fifth layers is in the range of $0.500 \lambda_o > N d > 0.250 \lambda_o$, while the optical thickness of at least another layer of the third, fourth and fifth layers is in the range of $0.250 \lambda_o > N d > 0.060 \lambda_o$, wherein N refers to the index of refraction and d refers to the physical thickness of the layer, the second coating layer is selected from the group consisting of $CeO_2$, $ZrO_2$, $TiO_2$, $Ta_2O_5$, ZnS and $ThO_2$; the third coating layer is selected from the group consisting of $Al_2O_3$, MgO, $CeF_3$, $LaF_3$, $NdF_3$, BeO, $InO_2$, $ThOH_2$ and a mixture of MgO and $Al_2O_3$; the fourth coating layer is selected from the group consisting of $MgF_2$, $SiO_2$, $ThF_4$, $LaF_2$, $Na_3(AlF_4)$, $Al_2O_3$, and $CeF_3$; and the fifth coating layer is selected from the group consisting of $MgF_2$, $SiO_2$, $ThF_4$, $LaF_2$, $Na_3(AlF_4)$, $Al_2O_3$, $CeF_3$, $NdF_3$, MgO, BeO, $InO_2$, $ThOH_2$ and a mixture of MgO and $Al_2O_3$, the optical thickness of each layer being adjustable within the above ranges to compensate for variations from any design N whereby the design reflectance is maintained.

* * * * *